United States Patent [19]
Jerue et al.

[11] Patent Number: 6,059,092
[45] Date of Patent: May 9, 2000

[54] MATERIAL HANDLING ROBOT AND RAIL ASSEMBLY

[75] Inventors: Roy A. Jerue, Bloomfield Hills; Steven R. Walsh, Troy, both of Mich.

[73] Assignee: FANUC Robotics North America, Inc., Rochester Hills, Mich.

[21] Appl. No.: 08/996,613

[22] Filed: Dec. 23, 1997

[51] Int. Cl.$^7$ ................................................. B65G 37/00
[52] U.S. Cl. ................................................. 198/364; 901/9
[58] Field of Search .............................. 198/364; 901/15, 901/7, 9; 414/103, 110, 900, 72, 74

[56] References Cited

U.S. PATENT DOCUMENTS

| | | |
|---|---|---|
| 4,679,149 | 7/1987 | Merz . |
| 4,692,876 | 9/1987 | Tenma et al. . |
| 4,777,608 | 10/1988 | Hashimoto et al. . |
| 4,835,450 | 5/1989 | Suzuki . |
| 4,842,123 | 6/1989 | Visser . |
| 4,869,813 | 9/1989 | Bailey et al. . |
| 5,243,690 | 9/1993 | Chmielewski, Jr. et al. . |
| 5,438,647 | 8/1995 | Nagamatsu et al. . |
| 5,479,581 | 12/1995 | Kleinschnitz . |

*Primary Examiner*—Christopher P. Ellis
*Assistant Examiner*—Gene O. Crawford
*Attorney, Agent, or Firm*—Howard & Howard

[57] ABSTRACT

A robotic system for handling a plurality of items includes a conveyor that moves the items along a central longitudinal axis of the conveyor. A robot base is supported on a rail directly above the conveyor. The robot is moveable along the rail so that it moves along the axis of the conveyor. The robot includes a three-axis arm that is supported for movement relative to the robot base. The robot arm has equal, symmetric access to either side of the conveyor. The robot base does not rotate relative to the conveyor axis.

20 Claims, 3 Drawing Sheets

MATERIAL HANDLING ROBOT AND RAIL ASSEMBLY

BACKGROUND OF THE INVENTION

This invention generally relates to a robotic system for handling a large number of items that are to be arranged in a desired pattern.

A variety of material handling robot systems are available. These systems have different configurations depending on the particular needs of the application. One example of such a system is shown in U.S. Pat. No. 4,869,813. That system includes a robot assembly that retrieves an item from a single pick-up point and then moves to place the item in one of a variety of desired locations. In that system, the robot assembly requires the entire robot to repeatedly rotate about a main axis as it moves between the single pick-up point and the various desired locations.

While such an arrangement is useful for handling small objects that can be placed in small containers, for example, it is not without shortcomings and drawbacks. For example, when dealing with larger items, which require larger storage bins, the amount of space required for such a system becomes unworkable for many applications. Space constraints are a significant consideration in any robot system design. Another major shortcoming with conventional systems is that they are restricted to handling items in the order that they are introduced (i.e., on a first-in, first-out basis). Still another problem with such systems is that the robot must repeatedly rotate about its main axis many times throughout operation. Such repetitive motion requires more energy, takes more time and introduces an increased likelihood of undesirable wear on the moving parts, which may lead to more frequent maintenance. Further, the mechanical parts required render the system relatively expensive.

This invention addresses the shortcomings and drawbacks of the prior art by providing a unique configuration for handling a large number of items. This invention includes strategically locating a robot relative to a conveyor in a manner that reduces overall space requirements and enhances the efficiency of the robot.

SUMMARY OF THE INVENTION

In general terms, this invention is a system for handling a plurality of items that places a robot directly above a conveyor along which the items travel. The conveyor has a longitudinal axis and moves the items along that axis. The robot has a base and an arm supported on the robot base for movement relative to the base. The system includes a rail for supporting the robot base over the conveyor so that the robot can move along the conveyor axis without contacting the conveyor. Importantly, the inventive system allows the robot to handle items in any order to increase efficiency (i.e., the system is not restricted to a first-in, first-out handling mode). Further, the configuration of this invention provides the robot symmetrical access to either side of the conveyor, which results in significant space savings for most applications.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
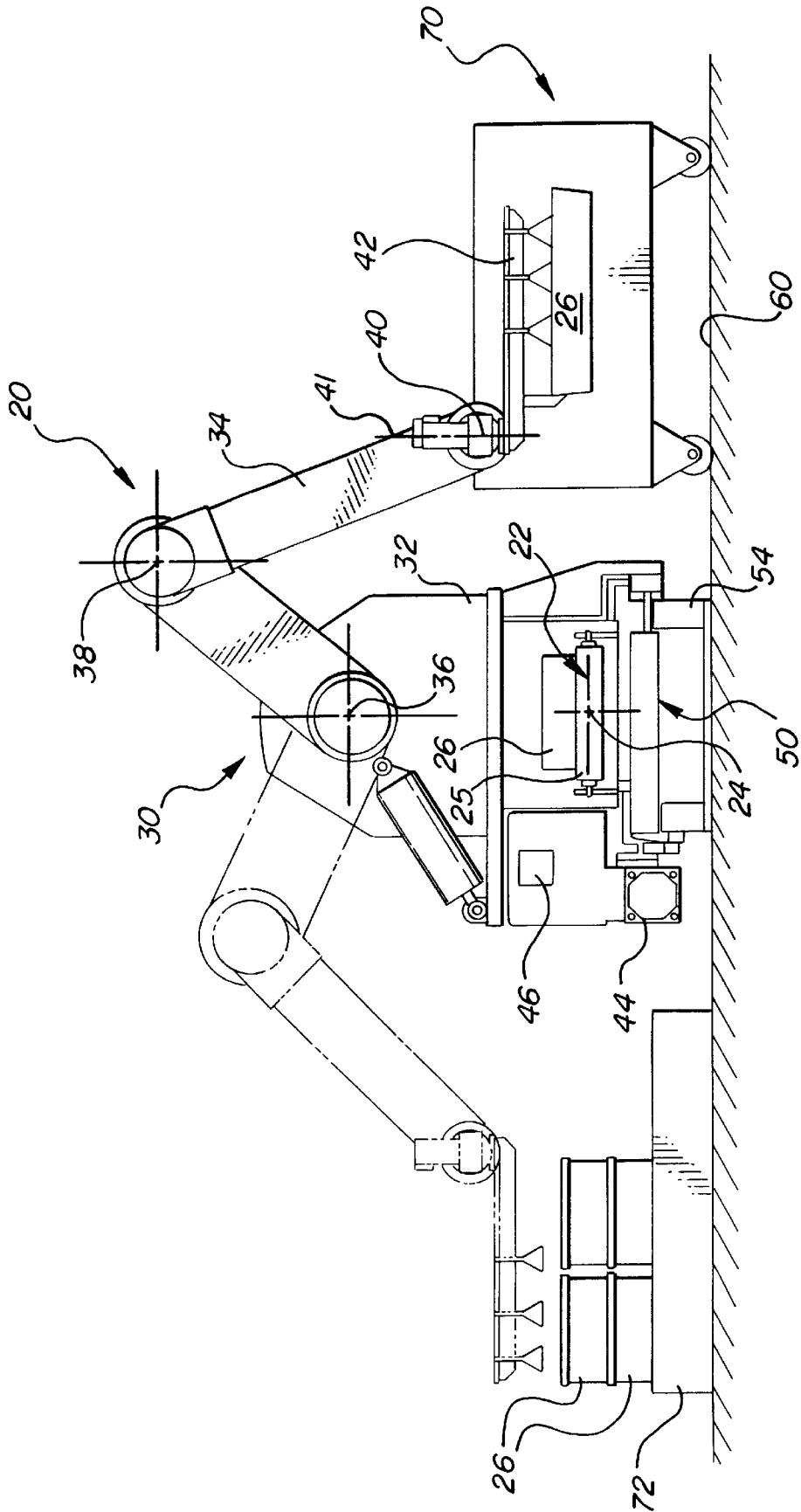
FIG. 1 is a diagrammatic illustration of a material handling system designed according to this invention.

FIG. 1 diagrammatically illustrates a system 20 for handling a plurality of items. A conveyor 22 has a longitudinal axis 24. The conveyor 22 that is illustrated in the figures includes a belt and a plurality of rollers 25. The term "conveyor" as used in this specification, however, should not be limited to such an arrangement. A series of rollers, which could be motorized, can be used as an alternative arrangement. Another example of a conveyor that would be within the scope of this invention includes a track with one or more moving members that move along the track to carry a plurality of items along the longitudinal axis of the conveyor.

Figure 3:
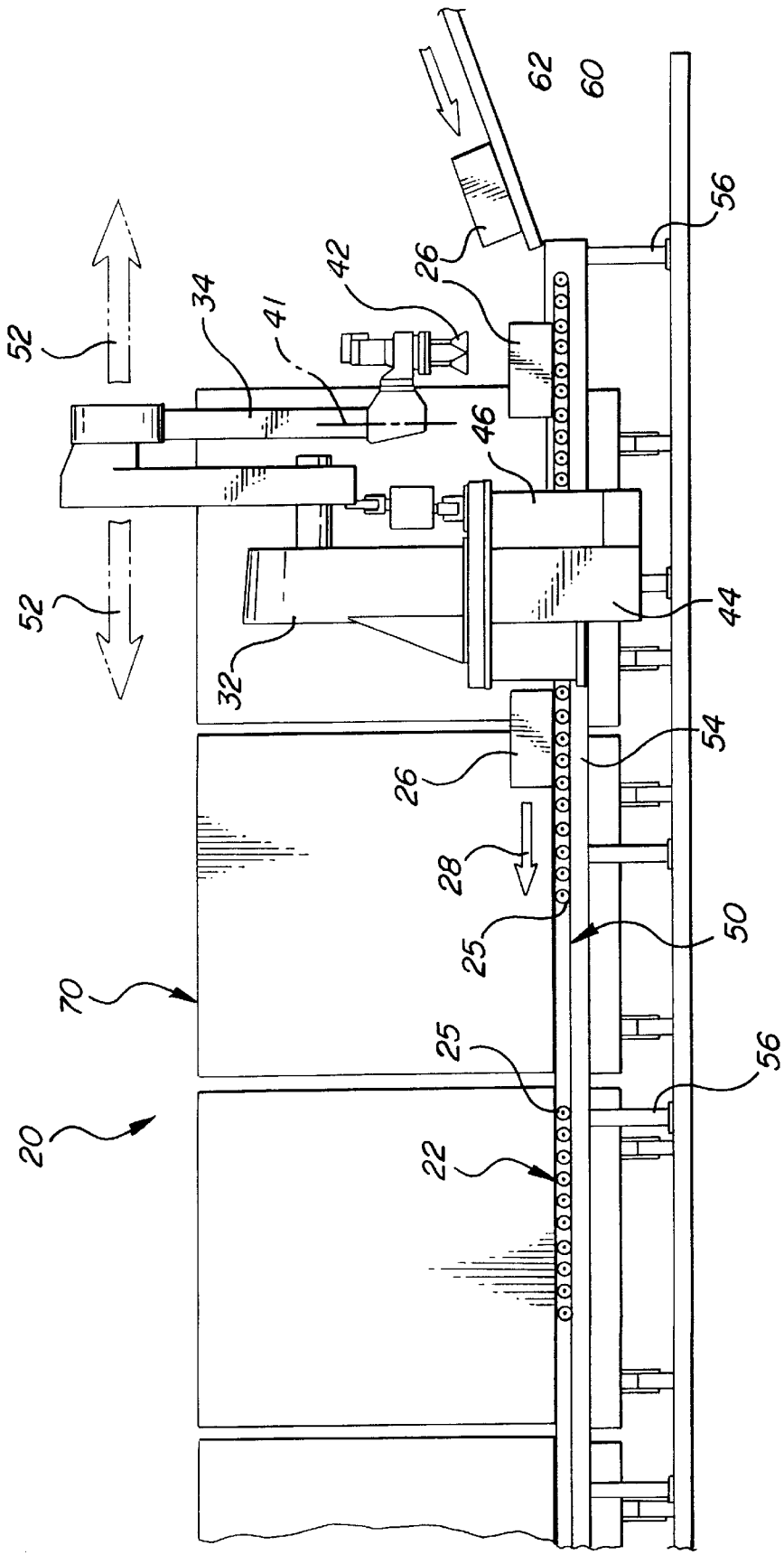
FIG. 3 is a side elevational view of the embodiment of FIG. 1.

A plurality of packages 26 are carried along the conveyor 22 as shown by the direction arrow 28 (FIG. 3).

A robot 30 includes a base 32 and an arm 34. The preferred arm 34 is known as a three-axis robot arm. The arm 34 moves about the two axes 36 and 38 relative to the base 32 so that the robot has equal and symmetric access to either side of the conveyor 22. The end of the arm 34 includes a mechanical link that supports a gripper 42 for handling the packages 26. The gripper 42 can be selected depending upon the needs of a particular situation. The gripper 42 preferably remains horizontal and is rotatable relative to the arm 34 about an axis 41 while the gripper remains parallel to the ground.

A robot mover 44 and a controller 46 (schematically illustrated) are supported by the robot base 32 in the illustration but they can be located remotely from the robot base 32. The robot mover 44 propels the robot 30 along a rail 50 as indicated by the direction arrows 52 in FIGS. 2 and 3. The rail 50 preferably includes a horizontally disposed portion 54 and a plurality of supports 56 to maintain the rail 50 in a desired position on a base surface 60 such as a floor. The robot controller 46 is programmed to control the speed and direction of movement of the robot 30 on the rail 50. Importantly, the rail 50 is positioned relative to the conveyor 22 so that the robot 30 moves along the longitudinal axis 24 of the conveyor 22. In the preferred embodiment, the robot base 32 is positioned above the conveyor 22 and a spacing is provided so that the packages 26 can pass beneath the robot base 32.

Figure 2:
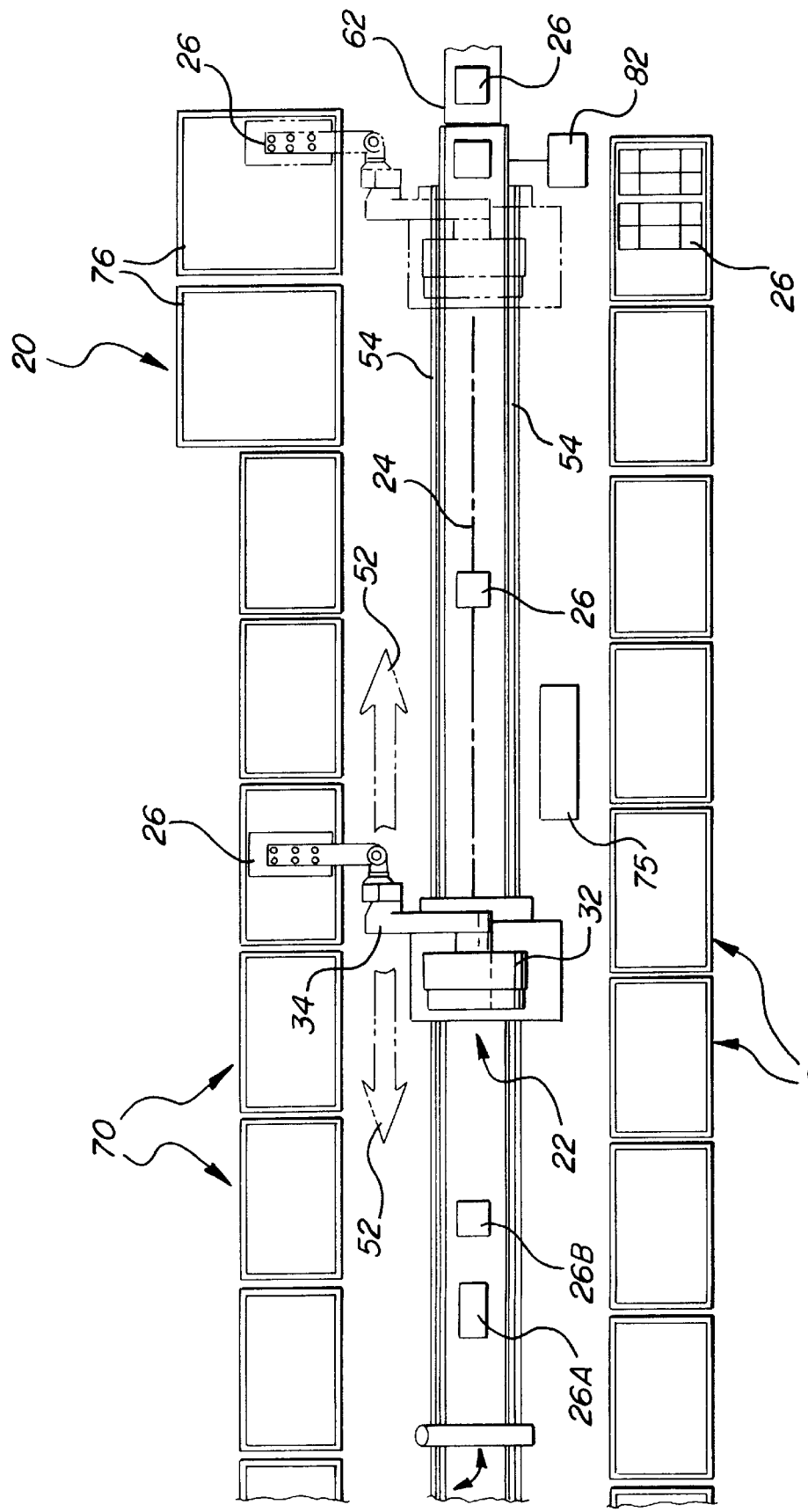
FIG. 2 is a top elevational view of the embodiment of FIG. 1.

As best seen in FIGS. 2 and 3, a feeding device 62, such as a chute, effectively delivers the packages 26 to the conveyor 22. Alternatively, the packages 26 could be manually placed onto the conveyor 22. Once a package 26 is placed on a conveyor 22, it is moved along the conveyor longitudinal axis 24 according to the direction arrow 28.

The robot 30 moves along the rail 50 and selectively removes packages 26 from the conveyor and places them in a desired location. In the illustrated embodiment, a plurality of bins 70 and a plurality of pallets 72 are positioned on opposite sides of the conveyor 22. The needs of a particular situation will dictate whether bins, pallets or some other arrangement is utilized. The symmetrical positioning of the robot 30 on the rail 50 provides the robot with equal access to either side of the conveyor 22.

The inventive system is particularly useful in a post office environment. In such a situation, each of the packages 26 is a bundled grouping of mail items that have been sorted according to zip code. The zip code of each package 26 is identified by a bar code reading device (not shown), for example. The zip code information dictates which of the bins 70 or pallets 72 that the particular package 26 should be placed into. The robot controller 46 preferably receives and processes information regarding the individual packages 26 and the desired location for each package. The controller 46 and the robot mover 44 then cause the robot 30 to move along the rail 50 into a position where the gripper 42 can engage the package 26. At that point, the arm 34 moves in a manner to remove the package from the conveyor 22 and to place it in the desired bin 70, for example.

Another preferred feature of a system designed according to this invention is to provide one or more cueing stations 75, which preferably are positioned between the conveyor 22 and the bins 70 or pallets 72. These cueing stations 75 allow the robot 32 to temporarily place an item 26 near its desired location in situations where the items are of differing sizes or shapes and proper stacking requires waiting for another item before placing the "queued" item into its desired location.

Another realization of a cueing station is illustrated at 76 where the robot 30 can place items 26 for recoding or later sorting. An example use for such a cueing station is where the system does not recognize an identifier o n a particular item 26 so that it cannot immediately determine the desired location for that item. The cueing station 76 allows the robot 30 to remove the package 26 from the conveyor 22 without upsetting the contents of any of the bins 70. Alternatively, an unidentifiable item 26 could simply be allowed to pass through and exit the end of the conveyor 22.

Another example of a cueing station is schematically illustrated in FIG. 2. A gate 78 is selectively moved into a position where it impedes the travel of one or more items along the conveyor 22. The gate 78 serves to define a cueing station on the conveyor 22. This type of cueing station is especially useful for preventing an item from excessively overtravelling its desired location and maintains it near the desired location until the robot 32 can move into position and remove it from the conveyor 22. Providing more than one such cueing station allows the robot 32 to clear sections of the conveyor, one section or area at a time.

A significant advantage is provided by the symmetrical arrangement of this invention. Further, by placing the robot on the rail above the conveyor, a significant space savings is accomplished. The symmetrical, longitudinal arrangement of this invention provides the ability to place a larger number of bins 70 within a confined space so that larger numbers of packages 26 can be handled in an efficient manner. The inventive arrangement also increases the number of pick-up points, which increases processing speed. Moreover, since the robot 30 has equal access to either side of the conveyor 22, there is no need to provide the robot base 32 the ability to rotate relative to the rail. This results in a more economical and stable arrangement that operates more efficiently than arrangements where the robot base is required to rotate about a main or central axis.

In the preferred embodiment, the conveyor 50 is powered so that it continuously propels the packages 26 along the longitudinal axis 24. A conveyor controller 82, which preferably communicates with the robot controller 46, controls the speed and movement of the conveyor 22. Such an arrangement allows for differences in speed between the movement of the robot and the conveyor to be accommodated in an efficient manner. For example, as shown in FIG. 2, packages 26A and 26B are approaching one end of the conveyor 22. Assume that package 26B should be placed into the bin 70B and package 26A should be placed into the bin 70A. By the time the robot 30 moves into position to engage the package 26B and place it into the bin 70B, it is possible that the conveyor 22 would propel the package 26A far beyond the bin 70A. To avoid this situation, the controller 82 preferably would slow down or even stop the conveyor 22 so that the robot 30 could efficiently place the packages 26A and 26B into the desired locations (i.e. bins 70A and 70B, respectively) while minimizing the amount of robot movement along the rail 50 that is required. A further enhancement that is within the scope of this invention is to selectively reverse or change the direction of conveyor travel whenever that would further minimize the amount of robot travel.

Given this specification, those skilled in the art will be able to realize the various robot components and the controllers necessary to accomplish the results described above.

The preceding description is exemplary rather than limiting in nature. Variations and modifications to the disclosed embodiment may become apparent to those skilled in the art that do not depart from the purview and spirit of this invention. Accordingly, the scope of legal protection given to this invention can only be determined from the following claims. Any numerals within the claims are for reference purposes only and should not be construed as limiting the scope of the claims.

The following is claimed:

1. A system (20) for handling a plurality of items (26), comprising:

a conveyor (22) having a longitudinal axis (24) for moving items (26) along said axis;

a robot (30) having a base (32) and an arm (34) supported on said robot base for movement relative to said base; and a rail (50) supporting said robot base over said conveyor for movement of said robot base along said axis, said rail including two elongate support members spaced apart in parallel to said longitudinal conveyor axis such that such robot base is supported on said elongate support members and said conveyor is positioned between said elongate support members and beneath said robot base.

2. The system of claim 1, wherein said robot (30) is mounted on said rail (50) for equal access to opposite sides of said conveyor (22) by said robot arm (34).

3. The system of claim 1, wherein the conveyor (22) includes a plurality of rollers (25) that each rotate about a roller axis that is perpendicular to said conveyor access.

4. The system of claim 1, wherein the conveyor (22) comprises a conveyor belt.

5. The system of claim 1, wherein said robot base (32) provides a clearance through which the items (26) are permitted to move as said items are moved along said conveyor axis.

6. The system of claim 1, wherein the conveyor (22) is maintained at a first height and a portion of the robot base (32) is maintained at a second height so that the items may pass beneath said robot base as said items are moved along said conveyor axis.

7. The system of claim 1, further comprising a second robot supported over said conveyor.

8. The system of claim 1, further comprising a controller (46) that controls the direction and speed of movement of said robot along said rail.

9. The system of claim 8, further comprising a controller (82) that controls a speed of movement of said conveyor.

10. The system of claim 9, wherein said robot controller (46) communicates with said conveyor controller (82) to thereby coordinate the respective speeds of said robot (30) and said conveyor (22).

11. The system of claim 8, wherein said controller controls a direction of movement of said conveyor.

12. The system of claim 1, wherein said robot base (32) is supported on said rail (50) so that said robot base does not rotate relative to said rail.

13. The system of claim 12, wherein said robot arm (34) comprises a three-axis arm such that said arm moves relative to said robot base (32) and has symmetrical, equal access to either side of said conveyor (22).

14. The system of claim 13, wherein one of said axes is defined through a connection between said robot arm (34) and said robot base (32).

15. The system of claim 14, wherein said one of said axes is generally parallel to said conveyor axis (24).

16. A system for handling a plurality of items, comprising:
  a conveyor having a starting point and an ending point with a length extending between the starting point and the ending point, the conveyor moving items from the starting point toward the ending point;
  a robot having a base and an arm supported on the base such that the arm is movable relative to the base; and
  a rail supporting the robot base directly over the conveyor such that the robot base is movable along the length of the conveyor.

17. The system of claim 16, wherein said rail (50) includes two elongate support members (54) spaced apart and parallel to said longitudinal conveyor access.

18. The system of claim 17, wherein said robot base (32) is supported on said elongate support members (54).

19. The system of claim 18, wherein said conveyor (22) is positioned between said elongate support members (54) and beneath said robot base.

20. A system for handling a plurality of items, comprising:
  a conveyor having a direction of travel along which the conveyor moves items;
  a robot having a base and an arm supported on the base such that the arm is moveable relative to the base; and
  a robot base support that supports the robot base directly above the conveyor such that the conveyor is directly beneath the base support and the robot base is moveable along the direction of travel of the conveyor.

* * * * *